(12) United States Patent (10) Patent No.: US 8,234,566 B2
Vaschillo et al. (45) Date of Patent: Jul. 31, 2012

(54) COLLAPSING MARGINS IN DOCUMENTS WITH COMPLEX CONTENT

(75) Inventors: Alexander Vaschillo, Redmond, WA (US); Sergey Genkin, Redmond, WA (US); Victor Kozyrev, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 12/041,625

(22) Filed: Mar. 3, 2008

(65) Prior Publication Data

US 2009/0222714 A1 Sep. 3, 2009

(51) Int. Cl.
*G06F 17/00* (2006.01)

(52) U.S. Cl. ......... 715/244; 715/243; 715/235; 715/788

(58) Field of Classification Search .................. 715/200, 715/235, 771, 205, 209, 788, 244, 243
See application file for complete search history.

(56) References Cited

U.S. PATENT DOCUMENTS

| | | | |
|---|---|---|---|
| 6,732,102 B1 * | 5/2004 | Khandekar | 1/1 |
| 7,024,621 B1 | 4/2006 | Tolpin | |
| 7,310,771 B2 | 12/2007 | Burago et al. | |
| 7,337,393 B2 * | 2/2008 | Chartier et al. | 715/235 |
| 2004/0255244 A1 | 12/2004 | Filner et al. | |
| 2005/0097448 A1 | 5/2005 | Giannetti et al. | |
| 2006/0136818 A1 | 6/2006 | Burago et al. | |
| 2007/0016854 A1 | 1/2007 | Burago et al. | |

OTHER PUBLICATIONS

Mozilla Foundation, Firefox 2.0, Oct. 2006, Version 2.0.*
W3C, Box Model, Feb. 2007.*
Mozilla Foundation, nsBlockReflowContext.h, Oct. 2006, Firefox 2.0, at ComputeCollapsedTopMargin().*
W3C, 8 Box Model, Feb. 2007, <http://www.w3.org/TR/CSS2/box.html>.*
"CSS—Auto-Height and Margin-Collapsing . . . or . . . Miraculously Shrinking Containers!," downloaded Mar. 24, 2008 from http://www.researchkitchen.de/blog/archives/css-autoheight-and-margincollapsing.php, 8 pages.
"CSS: Margin Collapsing," downloaded Mar. 24, 2008 from http://developer.mozilla.org/en/docs/CSS.margin_collapsing, 2 pages.
"CSS Tutorial—Margin Collapsing," Mar. 6, 2008 from http://www.howtocreate.co.uk/tutorials/css/margincollapsing, 8 pages.

(Continued)

*Primary Examiner* — Adam M Queler
*Assistant Examiner* — Aaron Johnson
(74) *Attorney, Agent, or Firm* — Hope Bladauff Hartman, LLC

(57) ABSTRACT

Architecture that facilitates the calculation of the final margins and positions of all objects in one formatting pass, without the need to reformat an object in the margin neighborhood. Clearance objects, float objects, and empty objects are taken into account. The one-pass algorithm computes the positions of objects on the document due to collapsing margins, determines the sizes of the resulting collapsed margins, and correctly places empty objects, floats, and clearance objects in the document. Clearances due to objects that belong to the neighborhood are processed as well as clearances due to objects outside of the neighborhood.

9 Claims, 7 Drawing Sheets

OTHER PUBLICATIONS

"Hand Coding: Andy Budd on CSS Margin Collapsing" Feb. 24, 2004, downloaded Mar. 24, 2008 from http://www.handcoding.com/archives/2004/02/14/andy-budd-on-css-margin-collapsing/, 4 pages.

Budd, Andy, "No Margin for Error," Nov. 23, 2003 from http://www.andybudd.com/archives/2003/11/no_margin_for_error/, 13 pages.

Ob, Paul, "Where's my Margin Gone? (or why 1+1=1)," May 7, 2007, downloaded from http://www.search-this.com/2007/05/07/wheres-my-margin-gone-or-why-111/, 9 pages.

O'Callahan, Robert, "Gecko 1.8 for Web Developers: Collapsing Margins and the Clear Property, " Mar. 27, 2005, downloaded from http://weblogs.mozillazine.org/roc/archives/2005/03/gecko_18_for_we_1.html, 3 pages.

\* cited by examiner

COLLAPSING MARGINS IN DOCUMENTS WITH COMPLEX CONTENT

BACKGROUND

When two or more adjacent elements on a page specify an intervening margin, it is desirable that the margins be collapsed to form a single common margin of a size that is usually smaller than the sum of margins of individual elements. One standard that relates to this problem, cascading style sheets (CSS), defines a number of rules for how adjacent margins should be collapsed, what the resulting size of a common margin needs to be, and how do certain special objects behave when located in the area of collapsing margins (the "margin neighborhood"). These rules can be quite complex and differ from the rules used in word processors. Moreover, none of the existing CSS version 2.1 browsers support these rules correctly.

One of the difficult problems comes from the fact that the result of margin collapsing between blocks can affect the positions of float objects ("floats", and other out-of-flow objects). Additionally, the positions of floats can affect positions of in-flow elements with a designated "clear" property. (An element with the "clear" property requests that no floats be placed next to the element on the page—at the same height). Elements with the "clear" property can be part of the margin neighborhood and a change in position of the element results in a change in the calculated size of common margin. This initiates a circular process that makes determination of the final result a complex task.

Another type of complexity results from objects that are referred to as "empty". Empty objects have no in-flow content, but can have out-of-flow content making the positioning of the content a complex consideration. The rules for positioning empty objects differ. Some rules call for analyzing only part of the margin neighborhood, so the positions are affected by a different set of elements. A third type of complexity is introduced from a hierarchical nature of documents and a requirement that all objects, including nested child objects, take part in margin collapsing.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an algorithm that facilitates the calculation of the final margins and positions of all objects in one formatting pass, without the need to reformat an object in the margin neighborhood. Clearance, floats, and empty objects are taken into account. The one-pass algorithm computes the positions of objects on the document due to collapsing margins, determines the sizes of the resulting collapsed margins, and correctly places empty objects, floats, and cleared objects in the document.

The architecture includes a margin collapsing (MC) module that collects all information for a margin neighborhood to analyze all the information at once. All objects, object margins and properties are reported to the MC module. The margins are reported to the MC module in the natural order in which the information occurs in a flattened version of the document.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
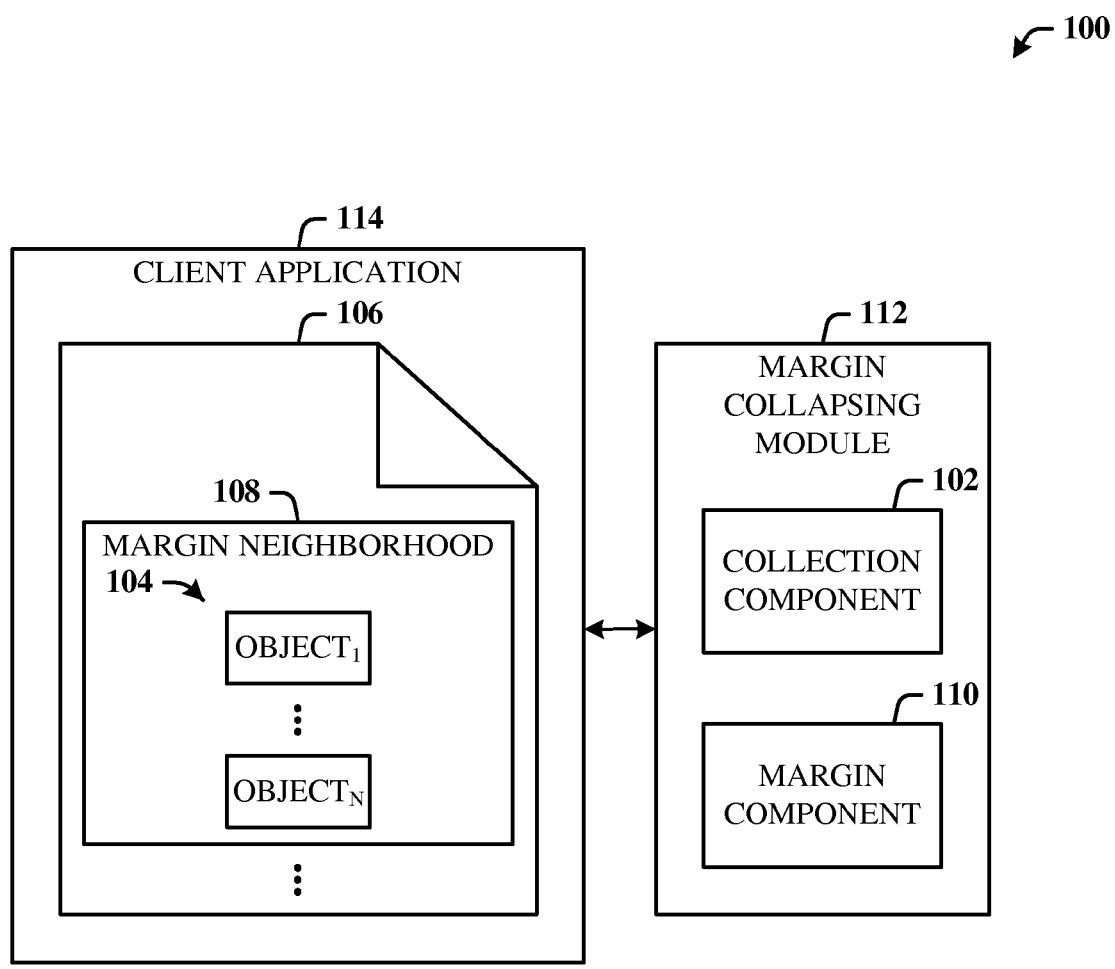
FIG. 1 illustrates a computer-implemented system for processing objects in a document.

The cascading style sheets (CSS) standard addresses ways in which to format data in web (e.g., HTML-hypertext markup language) documents. According to the CSS standard, a box model for a document object defines the content of an object within an area referred to as padding, the padding is within an area referred to as a border, and the border is within an area referred to as a margin. Margins and padding allow for introducing white space around the content to provide a more appealing view. The content, padding, border, and margin areas can be defined as geometric shapes (e.g., rectangles) having horizontal and vertical sides, for example. The areas can also be defined according to pixels relative to a horizontal dimension (width) and a vertical dimension (height).

Web browsers can use CSS to layout the content of document objects and to also provide visual formatting, color, etc. For example, a web browser constructs a rectangle for each elements of a web page and lays out the objects in some representation for viewing by the browser user. CSS determines the position, color, borders, font, and style of the content of each page element.

The disclosed architecture includes an algorithm for computing the positions of objects on a document when margins are reduced or collapsed entirely. A margin collapsing (MC) module is provided on the client system as a separate module that collects all information about an entire margin neighborhood in order to analyze all information at once.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for processing objects in a document. The system 100 includes a collection component 102 for collecting object information of objects 104 in a document 106 and associated object margins in a margin neighborhood 108 of the objects. A margin component 110 collapses the margins in one formatting pass for proper placement of the objects 104 in the document 106. The margin component 110 calculates the sizes of the resulting collapsed margins.

Figure 2:
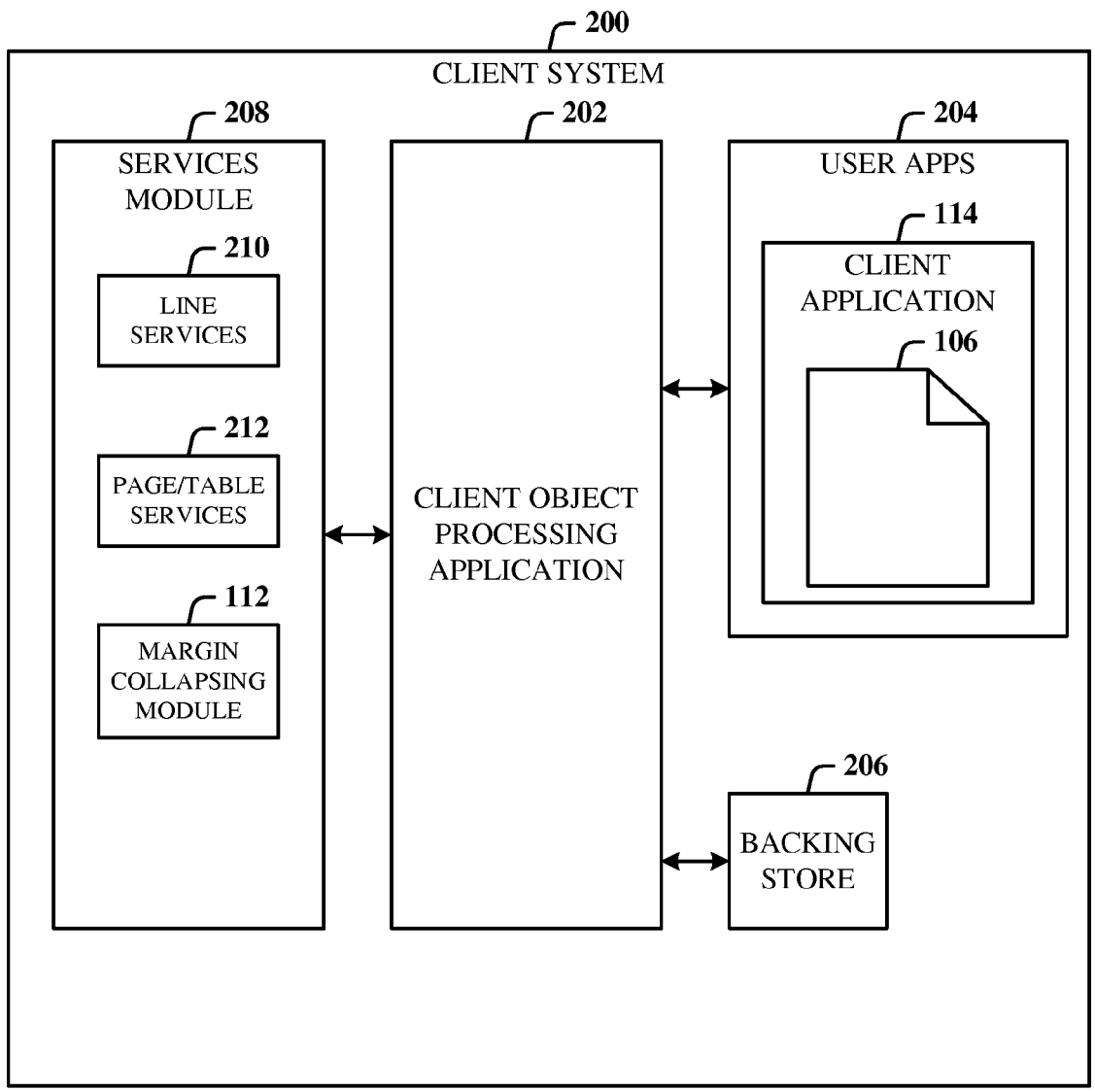
FIG. 2 illustrates a client system for collapsing margins of document elements.

The collection component 102 and the margin component 110 are embodied as a margin collapsing module 112 that interacts directly or indirectly with a client application 114 (e.g., browser, word processor, spreadsheet, etc.). As is shown in FIG. 2, the margin collapsing module 112 can be part of one or more services for properly formatting and positioning objects in the document 106.

Other aspects of the system 100 include the following. The collection component 102 reports to the margin component 110 neighborhood information such as object properties of an object belonging to the margin neighborhood. The properties include one or more of the size of the top and bottom object margins, if the object is in-flow or out-of-flow, if the object has a clear property, and/or if the object is empty. The object margins are reported according to a predetermined order (e.g., the natural order in a top-down manner). The margin component 110 combines all margins by adding a most positive margin and a most negative margin to obtain a resulting white space, and allocates the white space for a last margin on a top level. The margin component 110 generates margin space and inserts the margin space as a last margin on a top level. The margin component 110 processes at least one of a static clear or a dynamic clear. The objects 104 include at least one of cleared objects, float objects, or empty objects.

A margin neighborhood is an ordered set of adjacent margins. The basic structure of the margin neighborhood is typically several (but could be zero) object bottoms followed by several (but could be zero) object tops. The point between the two belongs to the highest level track of the neighborhood, and that is the place where margin space is inserted. Anywhere inbetween these basic participants, empty objects can be present. The margin neighborhood extends from (in the main flow) ink-to-ink. The object processing client determines the neighborhood thereby recognizing characteristics such as borders (which stop the neighborhood) and empty elements (which do not stop the neighborhood). The object processing client passes the result of the neighborhood calculation to a service (a page/table service) of the services module (e.g., in a callback). The term "empty" means empty from the point-of-view of the margins collapsing in the current document; for example, a float is empty.

All elements in the neighborhood and corresponding margins are reported to the MC module 112 along with properties such as size of the top and bottom margins, whether the element is in-flow or out-of-flow, whether the element has a "clear" property, and whether the element is empty, for example. The margins are reported in the natural order (the order of appearance in a flattened document) of occurrence in the document. In one example, first, all the bottom margins are reported (from innermost elements to outermost), and then all top margins (from outermost elements to innermost).

The client system includes a document object processing client application (see FIG. 2) and a client services module (see FIG. 2) that provides one or more services to the object processing client when processing objects, object content, margins, padding, borders, etc., for the positioning in the document when accommodating a specific computing system display capability. For example, a smaller device display will present a web page document and the associated objects (e.g., content, images, etc.) differently than a larger display device. This margin information is collected from the object processing client application once, and then handled by the client services module. This is described in greater detail infra.

A goal of margin collapsing is advancing the pen at an appropriate moment. This advancement occurs before or after an object. The resulting white space (which can be negative) is called margin space. The goal of the algorithm is producing margin space that eventually can be reduced or collapsed entirely.

There are several points in a document where the margin is calculated as a distance that is to be allowed from the last content (dvrUsed) to the point in question. These points are referred to a margin collapsing point (MCPs). The points include start of an in-flow object, start of an out-of-flow object, and bottom border.

The position of each in-flow object may be affected by previous in-flow objects and subsequent in-flow objects. Generally, the algorithm finds the first content before an MCP, the first content after MCP, and then collapses all margins between these contents using a CSS calculation formula. The word "content" here is defined in a CSS-specific way and is defined similar to: "a character or border of the main flow". Note that finding the first content may mean looking ahead, looking behind, looking deep into descendants, etc.

The position of each out-of-flow object (such as a float object) is affected only by the positions of objects that precede the out-of-flow object in a client-based backing store. Note, however, that positions of the preceding objects may, in turn, be dependent on other objects that are much later. The position of the out-of flow object does not directly depend on the objects that follow the out-of flow object in the backing store (indirect dependency is present). The algorithm of "finding the first content" still applies, but only going up, not down.

The position of each bottom-border depends only on the objects that precede the object in the backing store. The algorithm of finding the "first content" still applies, but only going up, not down.

The MC algorithm also takes care of the clear property. The algorithm advances the pen for objects with the "clear" property in such a way that the objects are moved to the place below any obstacles (e.g., floats). Two distinct types of clear property are static and dynamic. Even before objects that participate in a margin neighborhood are formatted, it is sometimes possible to predict that clearing will happen. For example, there is a float in the "tops" part of the neighborhood and an element that follows the float has the clear property. Such clearing divides the neighborhood into parts which do not influence each other, such as in different neighborhoods.

Sometimes, it is unknown if clearing happens until the collapsed margin is calculated. For example, a float from above sticks into the neighborhood, and there is an element with clear property. In another example, there is a float in the neighborhood before the "tops" part, and an element in the "tops" part has the clear property. Dynamic clearing occurs if margin shift of the float plus height of the float is bigger than the margin space.

Empty elements involve different processing. An empty element behaves differently depending on whether its parent's top margin is available to collapse with. If the element is a "top" empty element (the parent's top margin is there), the element drops down to the level of the parent and does not require any change in the basic algorithm. If the empty element is of a "middle" kind, the element's position is calculated separately from all other elements by combining all margins preceding this element with its own top margin and all margins inside it. The middle element still needs to be shifted down, but this shift does not influence elements that follow (but influences elements inside).

A feature of the MC algorithm is that of being a one-pass solution, and thus, very efficient. There is no restart of the algorithm which means that discovery of a dynamic clear does not change the layout of elements before it. Dynamic clear (once discovered) breaks neighborhood into two parts similar to what static clear does. The first part is already laid out and stays as it is. For the second part, the algorithm is repeated, resulting in new shift/margins space values. However, dynamic clear does not result in an element moving up.

FIG. 2 illustrates a client system 200 for collapsing margins of document elements. The client system 200 includes a client object processing application 202 that facilitates the margin collapsing process for documents of one or more user applications 204 (e.g., word processor, presentation, browser, etc.), such as the client application 114 and associated document 106, that create or process documents with objects. The client object processing application 202 collects the object information for the objects in a margin neighborhood, margin neighborhood information, margin properties, etc., among other functions (e.g., autofitting), and store this information in a backing store 206. The backing store 206 is a file that also stores properties associated with objects such as object width, page breaks relative to an object (e.g., before, after, inside), and an ordered set of the objects as being analyzed and formatted.

The client object processing application 202 interfaces to a services module 208 that provides support for line services 210 and page/table services 212 and margin collapsing via the margin collapsing module 112.

Following is a more detailed description of the processes associated with margin collapsing.

The MC module 112 retrieves all backing store information from the client application 202 using a pfnGetMarginNeighborhood callback. The MC module 112 also asks a geometry algorithm if there are floats overhanging the beginning of the neighborhood on the left and on the right and the length of the overhang. From this information MC module 112 is able to calculate all margins and determine any clearances that may need to be processed.

The MC module 112 is able to determine elements for which there is clearance processing. Clearance processing is performed for those elements that have a clear flag, and either, (1) there exists a float in the neighborhood and this float has a common ancestor with the cleared element (in this case of a static clearance, it is known that the element starts at the same vr with the float, so it is cleared), or (2) the collapsed top space that will be assigned to this element from the top of the neighborhood is less than the overhang reported by geometry (a dynamic clearance).

Initially, the MC module 112 goes through the margin neighborhood in a top-down manner until one of the following events occurs: the end of the neighborhood is reached, or until the module 112 determines a clearance will be processed, or until the module 112 finds a float with no preceding parent in the neighborhood.

The MC module 112 then collapses all the margins detected on the way (including top and bottom margins of empty elements) and assigns the appropriate top space to the element that had the first top margin and was not empty (outermost parent). All child elements are assigned zero top space, which makes the children elements align to the parent's top edge.

For empty elements that have no preceding parent in the neighborhood, the MC module 112 collapses all the margins preceding this empty element in the neighborhood including its own top (but not bottom) margin, and all the margins of its children (including top and bottom margins of preceding empty elements). The resulting collapsed top space is then assigned to the empty element, and all child elements are assigned zero top space as these child elements are also empty.

For a cleared object, the MC module 112 calculates its clearance and assigns the clearance to this element as a top space. All elements after the cleared element assume the cleared element had margins equal to this top space and continue margin collapsing as usual. Note, that several clearances can occur in one neighborhood, and margin collapsing is restarted after each clearance occurrence. Additionally, new overhangs are requested and margin collapsing is restarted after formatting each float that does not have a preceding parent in the neighborhood.

The initial clearance is calculated in the MC module 112, and the cleared vr is passed to the object for formatting, starting at that vr. However, the object may then need to add more clearance, in some cases. The MC module 112 provides the object with a vr that is clear from floats/figures at its beginning. However, if there is a figure positioned somewhere below this cleared vr, and the cleared object is high enough to hit the figure, the MC module 112 may apply additional clearance to clear that figure. This additional clearance, however, does not affect the margin collapsing algorithm. The MC module 112 receives a bit indicating that the additional clearance actually happened, and that recalculation of margins can then be performed.

One possible approach to resolving margin change involves using an fMarginsChanged bit returned by the client application 202 in a pfnGetMarginNeighborhood callback for the entire neighborhood. Track uses this bit to know that the neighborhood is dirty (at least one margin in the neighborhood has changed), and thus, the previous formatting for any of the objects in this neighborhood cannot automatically be reused.

During update, some margin state is preserved from previous objects to following objects because a change in margin of a previous object can easily change the margin (top space) of following objects. This is facilitated by the client application 202 remembering this state. The page/table services 212 then compares this state before each object.

The services module 208 formats objects in the order in which the objects appear in the backing store 206. Once the services module 208 arrives at the next MCP, the services module 208 calls a callback to the client application 202 (GetTopSpace( )) with the following input and return parameters.

Input Parameters:
Name of the object that requires margin collapsing at this MCP
Enumeration defining of which situation of the three situations above (start of in-flow object, start of out-of-flow object, and bottom border)
Width of the parent object—the one of which this MCP is the child. This is the width of the current track. Note that for bottom border, the width is the width of object being bordered.
Name of this parent object
A pointer to client defined data structure CollapsedMarginsStorage (opaque to the services module 208)

Return Parameters:
A pointer to possibly updated client defined data structure CollapsedMarginsStorage (opaque to the services module 208)
dvrTopSpace for the object undergoing margin collapsing (from the last in-flow ink).

CollapsedMarginsStorage is a structure that lives a very short life between some of the adjacent MCPs. CollapsedMarginsStorage can be destroyed immediately after the first in-flow content (or border) is placed on the page. CollapsedMarginsStorage is passed as input to a Format method of subtracks and other objects, but is not returned back and lives in the track that created it (and its children) and dies with the track that created it. CollapsedMarginsStorage is utilized primarily for proper calculation of the margins that depend on the width of the parent object. CollapsedMarginsStorage also helps optimize performance by not recalculating the same margins several times. In one implementation, CollapsedMarginsStorage works as a queue rather than an array, so no walking through it is required at any time.

The CollapsedMarginsStorage data structure contains an array of names of objects for which margins have been resolved already, and the corresponding margins. A GetTopSpace callback first looks up whether the margin for the requested object has been calculated already, and if so, returns the value "do nothing else". If the margin is not found, GetTopSpace calculates the margins for all objects that are used to calculate the position of the object requested, and all objects that are in the way (e.g., some floats and empty content blocks). GetTopSpace records all findings in the CollapsedMarginsStorage structure and returns the requested dvrTopSpace.

Following is an example that illustrates the CollapsedMarginsStorage data structure. Consider the following CSS:

```
<div id="S1" style="margin-bottom: 30px">
    <div id="A1" style="margin-bottom: 30px">
        <div id="A2" style="margin-bottom: 30px">
            <div id="A3" style="margin-bottom: 30px">
                Some text. Algorithm starts here.
            </div>
        </div>
        <div id="F1" style=" float: left; width: 200px; height: 120px">
            Float
        </div>
    </div>
    <div id="F2" style=" float: left; width: 200px; height: 120px">
        Float
    </div>
    <div id="B1" style="margin-top: 30px">
        <div id="F3" style=" float: left; width: 200px; height: 120px">
            Float
        </div>
        <div id="B2" style="margin- top: 30px">
            <div id="B3" style="margin- top: 30px">
                Some text. Algorithm ends here.
            </div>
        </div>
    </div>
</div>
```

The example discussion begins with the neighborhood defined inside A3 and finishes inside B3, showing how the data flows for all margins between these two points. Initially, the CollapsedMarginsStorage structure is empty. The first MCP that the services module 208 encounters is at the top of F1. At this point, the GetTopSpace callback is called and given the width of A1. The GetTopSpace callback looks at the margins of A2 and A3 to figure the position of F1. No look-ahead occurs and nothing gets recorded in CollapsedMarginsStorage.

The second MCP is at the top of F2. The CollapsedMarginsStorage structure is still empty. The GetTopSpace callback is called given the width of S1. The GetTopSpace callback looks at the margins of A1, A2 and A3 to figure the position of F2. No look-ahead occurs and nothing gets recorded in CollapsedMarginsStorage.

The next MCP is at the top of B1. The CollapsedMarginsStorage structure is still empty. The GetTopSpace callback is called given the width of S1. The GetTopSpace callback looks at margins of A1, A2 and A3 as well as B1, B2 and B3 to figure the position of B1. Here, looking ahead occurs. All margins are collapsed at once. Looking ahead encountered B1, B2, B3 and F3. The collapsed margins are recorded for all of B2, B3 and F3 in the CollapsedMarginsStorage structure. The margin of B1 is returned.

The next MCP is at the top of F3. The CollapsedMarginsStorage structure has margins recorded for B2, B3 and F3. The GetTopSpace callback is called and immediately returns the stored value of F3 margin.

For B2 and B3 the code flow is the same as for F3. The track encounters some characters in the main flow (contents of B3) and cleans up the CollapsedMarginsStorage structure.

The MC module 112 uses the following callback to obtain all the information about a margin neighborhood.

```
pfnGetMarginNeighborhood(in:nmPara, fBeforePara, durSubpage,
    nmSubpage, NeighborhoodSizeAlloc,
           out: rgMarginNeighborhood, NeighborhoodSize)
struct FsMarginNeighborhoodInfo {
    nmPara,
    fskClear,
    fOutOfFlow,
    fEmpty,
    fTopMargin,
    dvrMargin,
}
```

Following is an example data structure for a neighborhood reported to the services module 208 from the client object processing application 202.

| nmPara | fskClear | fOutOfFlow | fEmpty | fTopMargin | dvrMargin |
|--------|----------|------------|--------|------------|-----------|
| A3     | N        | F          | F      | B          | 30        |
| A2     | N        | F          | F      | B          | 30        |
| E1     | N        | F          | T      | T          | 30        |
| F1     | N        | T          | T      | T          | 0         |
| F1     | N        | T          | T      | B          | 0         |
| E1     | N        | F          | T      | B          | 30        |
| E2     | N        | F          | T      | T          | 30        |
| E2     | N        | F          | T      | B          | 30        |
| A1     | N        | F          | F      | B          | 30        |
| E3     | N        | F          | T      | T          | 10        |
| F2     | N        | T          | T      | T          | 0         |
| F2     | N        | T          | T      | B          | 0         |
| E3     | N        | F          | T      | B          | 10        |
| E4     | N        | F          | T      | T          | 30        |
| E5     | N        | F          | T      | T          | 30        |
| E5     | N        | F          | T      | B          | 30        |
| E4     | N        | F          | T      | B          | 30        |
| B1     | N        | F          | F      | T          | 30        |
| E6     | N        | F          | T      | T          | 30        |
| E6     | N        | F          | T      | B          | 30        |

-continued

| nmPara | fskClear | fOutOfFlow | fEmpty | fTopMargin | dvrMargin |
|--------|----------|------------|--------|------------|-----------|
| F3     | N        | T          | T      | T          | 0         |
| F3     | N        | T          | T      | B          | 0         |
| B2     | N        | F          | F      | T          | 30        |
| B3     | L        | F          | F      | T          | 30        |

The MC module 112 (FsGetMarginSpace function) is called from the track before and after each object. Track will then own the space used by the collapsed margin and advance dvr accordingly.

The MC module 112 ensures that for top margins each object gets its margin space measured from its parent's top edge, or previous non-empty content (start of neighborhood) whichever is closer. If the neighborhood ends with a bottom margin (which happens if the neighborhood ends with a bottom border), the last element in the neighborhood will receive MarginSpace at the bottom (before the border). By adding this space, track may exceed available space on the page, so track reformats itself finding an allowed break.

```
FsGetMarginSpace(in: nmPara, fBeforePara, vrCur, pGeom,
    inout: pFsMarginNeighborhood,
    out: dvrMarginSpace)
```

There can also be an output bit fMarginsChanged in this API.

FsMarginNeighborhood can be the same as pMCSClient, and can be passed to both sets of callbacks (the client application 202 and the MC module 112).

FsMarginNeighborhood will go through the system same way as an MCSClient pointer. This structure is created and later destroyed in the Page/Subpage, and is added as an input/output parameter to all formatting methods of all objects, and subtrack (but not subpage, since margin collapsing does not go through subpages). The following APIs to the MC module 112 can also be utilized.

```
FsCreateMarginNeighborhood(
    PFSCLIENT pfsclient,
    pFsMarginNeighborhood* ppNeighborhood);
FsDestroyMarginNeighborhood(
    PFSCLIENT pfsclient,
    pFsMarginNeighborhood pNeighborhood);
FsDuplicateMarginNeighborhood(
    PFSCLIENT pfsclient,
    pFsMarginNeighborhood pNeighborhood,
    pFsMarginNeighborhood* ppNewNeighborhood);
FsRestoreMarginNeighborhood(
    PFSCLIENT pfsclient,
    pFsMarginNeighborhood pNeighborhood,
    pFsMarginNeighborhood pNewNeighborhood);
FsFEqualMarginCollapsingState (
    PFSCONTEXT pfsc,
    pFsMarginNeighborhood pNeighborhood1,
    pFsMarginNeighborhood* ppNeighborhood2);
FsFMarginChangeAfter (
    PFSCONTEXT pfsc,
    FSNMPARA* pnmPara );
```

The MC module 112 asks geometry for floats overhanging the current vr on the left and on the right.

```
FsGetOverhangs(in:pGeom, vrCur, out:durSubpage, nmSubpage,
dvrLeftOverhang, dvrRightOverhang);
``` durSubpage is passed in due to greater reliability and availability in geometry. The user application (e.g., application 114) calculates the current margins (if the margins are set as percentages) starting from the nearest subpage, and then collapsing down.

There can also be an output bit fMarginsChanged in pfnGetMarginNeighborhood callback, but which is omitted here. fMarginsChanged is true if during update any of the margins in the neighborhood changed. This bit is returned to track so that track knows that the neighborhood needs updating.

Note that the tree structure of the document will be inferred by services module 208 from the order of objects in the neighborhood and the fTopMargin bit on each of the objects.

Margins are returned in a natural order. In the case where there are no empty elements, the natural order will result in the following: first, all the bottom margins are reported (from innermost objects to outermost), then all the top margins (from outermost objects to innermost). Note that empty objects will be reported twice in the array—once for the top margin and once for the bottom margin. These two places will be separated by margins of the empty element's children (if any).

Every object in the neighborhood is reported to the MC module 112 by the client object processing application 202, even if the object margins are zero. The services module 208 will made assumptions on the structure of the document based on the reported neighborhood.

Floats are reported in this array, but float margins are always zero, since floats do not have collapsible margins. Note that non-floating empty elements may have collapsible margins, and these margins will affect the positions of the floats contained inside.

Floats that are attached to text (rather than standalone floats) are reported as part of the neighborhood. The MC module 112 uses the floats to properly resolve the clearance property. Note, however, that if text contains several objects, inside some of which are floats and some have clear property, this clear property is resolved by the text. Text plays track for these objects so it is the responsibility of text to do what track does for its objects. Since track now takes care of clearance, text takes care of clearance for its children (objects attached to text). Text positions these objects without asking track for any help, and text will not use the MC module 112 for margin space for these objects—so text does the clearance processing.

A neighborhood ends with a border (top or bottom), non-empty content (ink), or a similar divider (subpage edge, scroller, etc.). The collapsed bottom space for the neighborhood is returned with the last object in the neighborhood and is accounted by the last (outermost) track.

The client application 202 notes that if a neighborhood ends with a bottom border belonging to element A, the bottom margin of the element A does not belong to the neighborhood and is not reported. The bottom margin will belong to the next neighborhood—after the border.

As previously indicated, margin collapsing is implemented in a separate MC module 112. The module 112 exposes an FsGetMarginSpace API that is called from a track method ("track") before and after each object. Track then owns the space used by the collapsed margin and advances dvr accordingly.

The MC module 112 can store data as margin collapsing state. This state structure is processed through the system in the same manner as geometry information. The margin collapsing state is created and destroyed in the Page/Subpage, and it is an additional input/output parameter to all formatting methods. The following APIs are called wherever parallel geometry APIs are called.

```
FsCreateMarginCollapsingState (
    PFSCONTEXT pfsc,
    PFSMCSTATE* ppMCState);
FsDestroyMarginCollapsingState (
    PFSCONTEXT pfsc,
    PFSMCSTATE pMCState);
```

Track is the only user of the MC module 112. Track calls the following API before and after each object.

```
FsGetMarginSpace(in: nmPara, fBeforePara, vrCur, pGeom,
    inout: pMCState,
    out: dvrMarginSpace)
```

With respect to update and restart logic, again, the margin neighborhood works like geometry. To support incremental update, the client application 202 reports to the services module 208 if there was any change in the margin neighborhood that starts immediately after the bottom margin of a given object (nmPara). The services module 208 uses the changes to any data normally reported with the neighborhood as well as any geometry in the neighborhood. This includes the sizes of margins, clear/float properties, any change in the vertical size of floats in the neighborhood, structural changes, etc.

Track is the only user of the MC module 112. Track calls

```
FsDuplicateMarginCollapsingState (
    PFSCONTEXT pfsc,
    PFSMCSTATE pMCStateIn,
    PFSMCSTATE* ppMCStateOut);
FsFEqualMarginCollapsingState (
    PFSCONTEXT pfsc,
    PFSMCSTATE pMCState1,
    PFSMCSTATE* ppMCState2);
and
FsRestoreMarginCollapsingState (
    PFSCONTEXT pfsc,
    PFSMCSTATE pMCStateIn,
    PFSMCSTATE* ppMCStateOut);
``` where duplicate, compare, and restore geometry APIs used to be called. A copy of the margin collapsing state before each object is stored in track for update.

It is possible to reuse a object in track if everything is synchronized above the object; there are no changes inside the object and in margin collapsing state after the object. Following is how track checks whether reformatting a object can be skipped:

```
If (geometry before = old geometry before &&
    MCS client before = old MCS client before &&
```

```
    margin collapsing state before = old margin collapsing
state before &&
        there were no changes in margin collapsing state after
the para)
    {
    copy old dobj;
    update geometry;
    copy old margin collapsing state after;
    }
```

For the check on line 3, FsFEqualMarginCollapsingState is used. For the check on line 4, the MC module 112 provides

```
FsFMarginChangeAfter (
    PFSCONTEXT pfsc,
    FSNMPARA* pnmPara );
```

The MC module 112 asks geometry for floats overhanging current vr on the left and on the right:

```
FsGetOverhangs(in:pGeom, vrCur,
out:durSubpage, nmSubpage, dvrLeftOverhang, dvrRightOverhang);
```

With respect to query changes, track owns margin space returned by FsGetMarginSpace. This space is reported during query time:

```
struct fsparadescription
{
    FSUPDATEINFO fsupdinf;
    PFSPARA      pfspara;
    PFSPARACLIENT pfsparaclient;
    FSNMPARA nmp;
    LONG idobj;
    LONG dvrUsed;       // returned by object formatting method
    FSBBOX fsbbox;
    LONG dvrTopSpace; // returned by object formatting method
    LONG dvrTopMarginSpace; // Added by Track outside of object
rectangle
    LONG dvrBottomMarginSpace; // Added by Track outside of object
rectangle
};
```

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
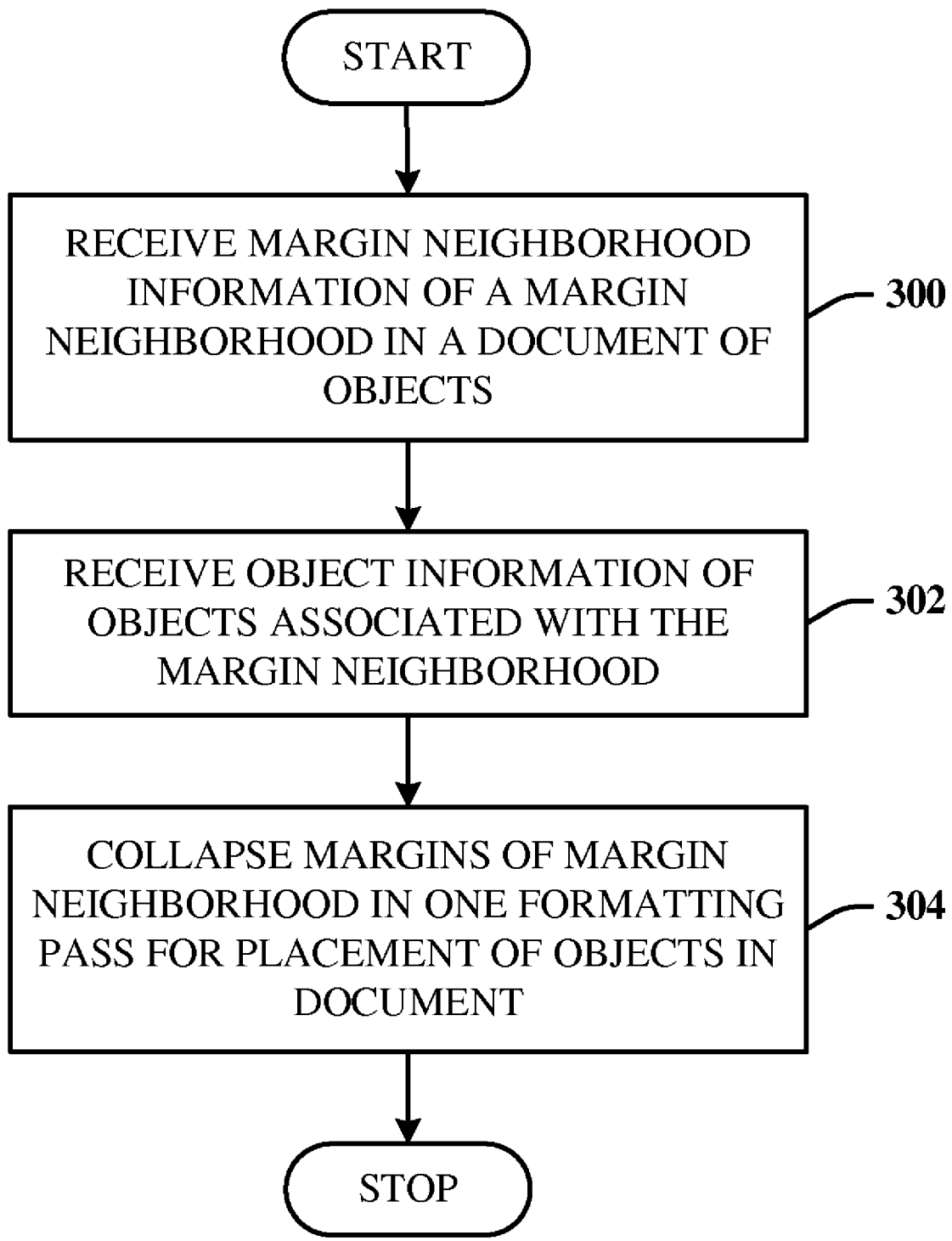
FIG. 3 illustrates a computer-implemented method of processing objects in a document.

FIG. 3 illustrates a computer-implemented method of processing objects in a document. At 300, margin neighborhood information of a margin neighborhood in a document of objects is received. At 302, object information of the objects associated with the margin neighborhood is received. At 304, margins of the margin neighborhood are collapsed in one formatting pass for placement of the objects in the document.

Figure 4:
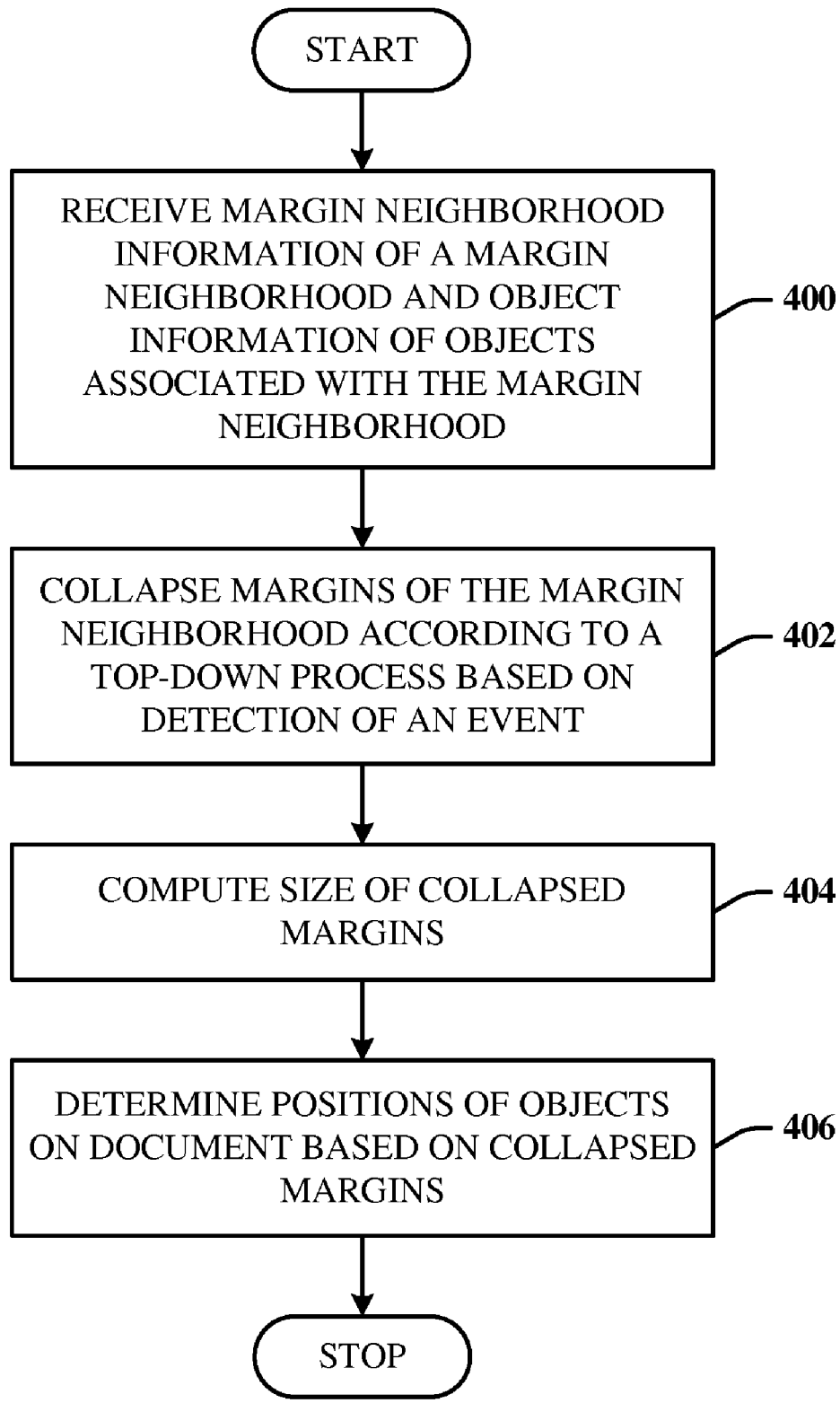
FIG. 4 illustrates an alternative computer-implemented method of processing objects in a document.

FIG. 4 illustrates an alternative computer-implemented method of processing objects in a document. At 400, margin neighborhood information of a margin neighborhood and object information of objects associated with the margin neighborhood are received. At 402, margins of the margin neighborhood are collapsed according to a top-down process based on detection of an event. At 404, size of the collapsed margins is computed. At 406, positions of the objects on the document are determined based on the collapsed margins.

Figure 5:
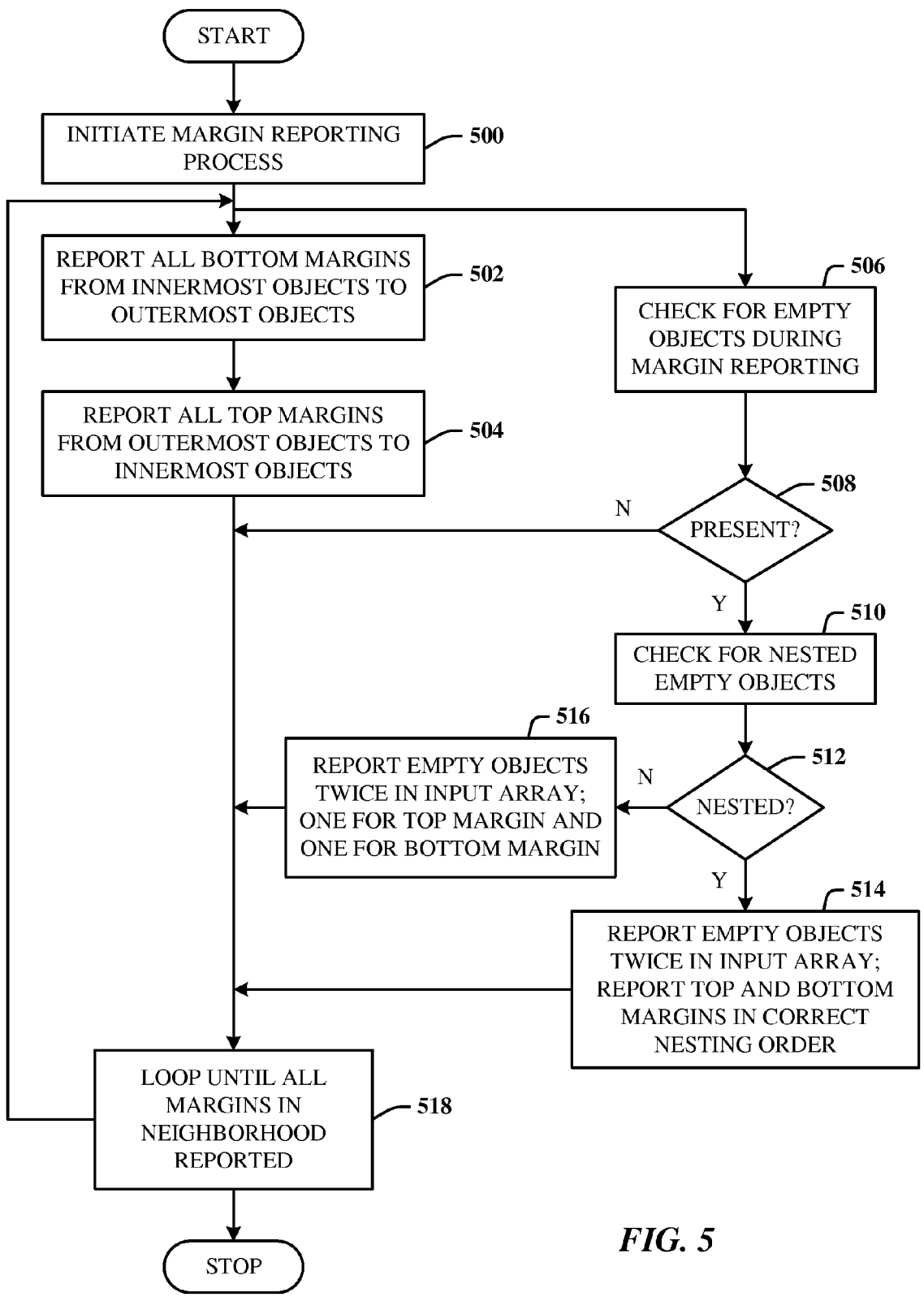
FIG. 5 illustrates a method of reporting margins.

FIG. 5 illustrates a method of reporting margins. As previously indicated, margins are stored in the backing store in the order reported when the document is flattened. Thus, the client object processing application reports the margins in the order stored in the backing store. At 500, a margin reporting process is initiated. At 502, all bottom margins are reported from the innermost objects to the outermost objects. At 504, all top margins are reported from the outermost objects to the innermost objects. As part of the reporting process, a check is made for empty objects, as indicated at 506. If an empty object is present, flow is from 508 to 510 to check for nested empty objects. If nested empty objects are found, flow is from 512 to 514 where the empty objects are reported twice in the array and, the top and bottom margins are reported in the correct nesting order. If there are no nested empty objects, flow is from 512 to 516 where the empty objects are reported twice in the input array, once for the top margin and once for the bottom margin. At 518, the process loops back to just after process initiation at 500 until all neighborhood margins are reported. More specifically, the process loops until a first of the following of in-flow content or border or padding is encountered.

Figure 6:
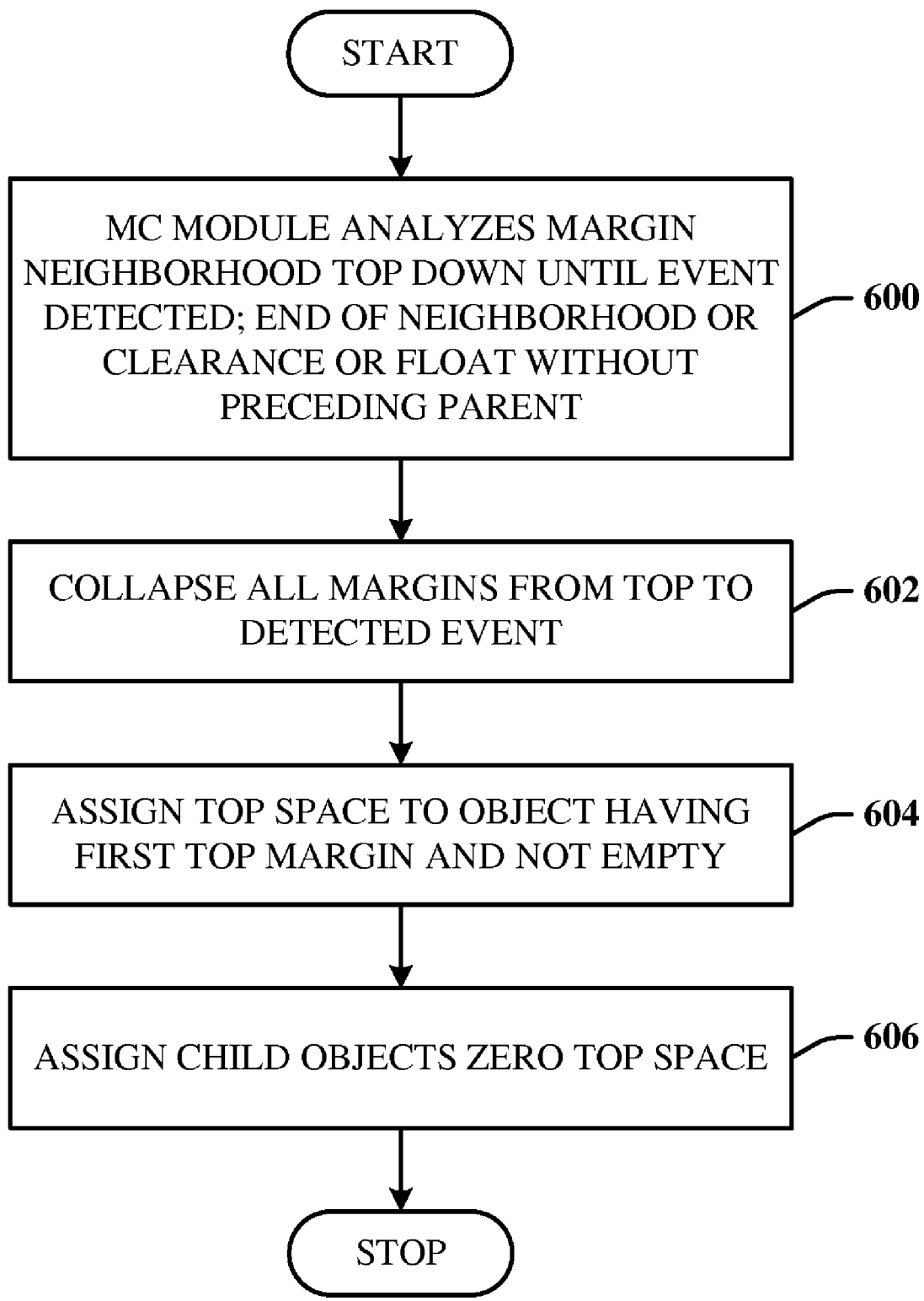
FIG. 6 illustrates a method of analyzing and collapsing margins.

FIG. 6 illustrates a method of analyzing and collapsing margins. At 600, the MC module analyzes the margin neighborhood top down until an event is detected. The event can be end of the neighborhood or clearance or a float without a preceding parent. At 602, once an event is detected, all margins from the top to the event detection are collapsed. At 604, the module assigns the top space to the object having the first top margin and is not empty. At 606, child objects to the object are assigned zero top space.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
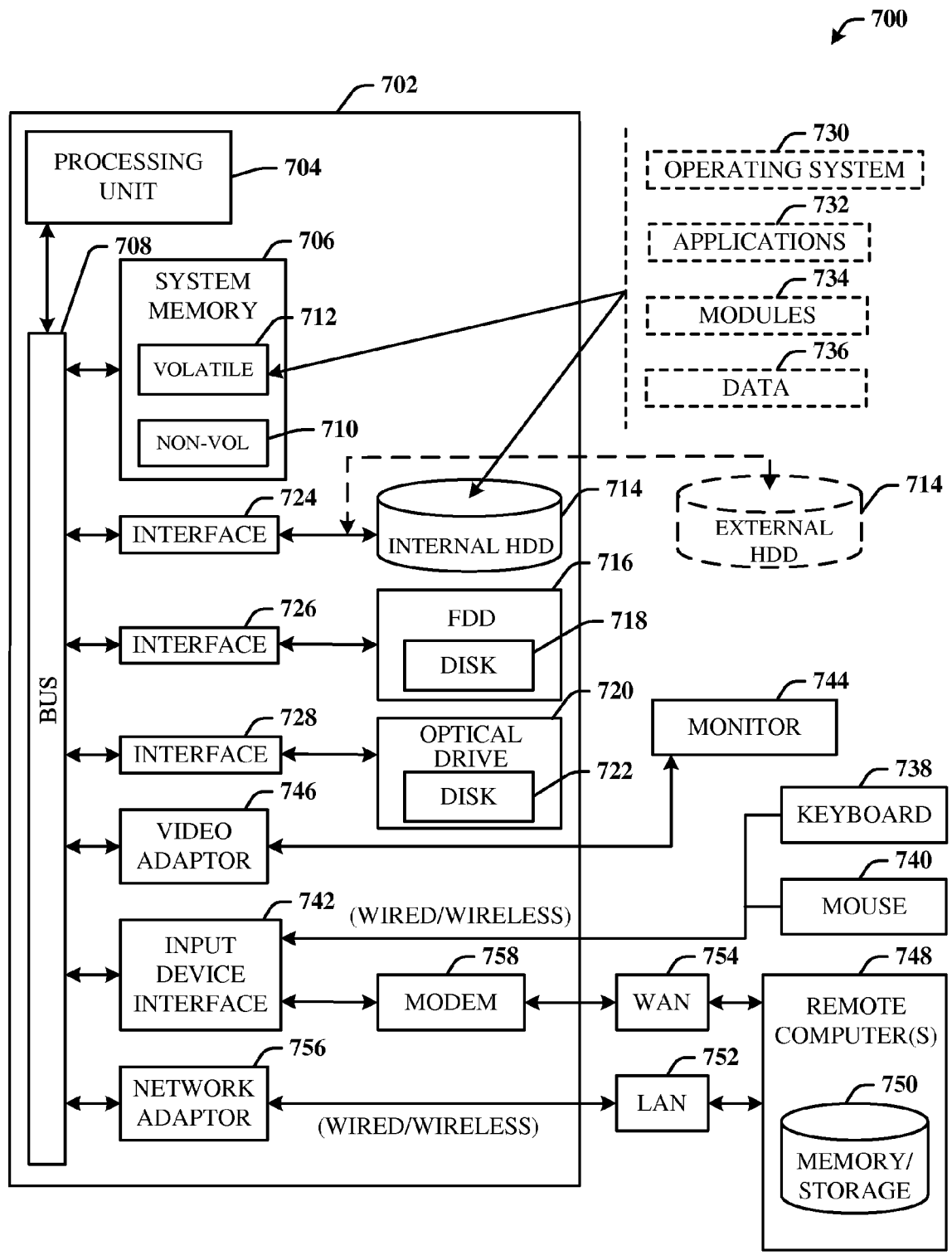
FIG. 7 illustrates a block diagram of a computing system operable to execute margin collapsing in accordance with the disclosed architecture.

Referring now to FIG. 7, there is illustrated a block diagram of a computing system 700 operable to execute margin collapsing in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. The one or more application programs 732, other program modules 734, and program data 736 can include the collection component 102, objects 104, document 106, margin neighborhood 108, margin component 110, MC module 112, client application 114, client object processing application 202, user apps 204, backing store 206, services module 208, lines services 210, and page/table services 212, for example. The client system 200 can be the computer 702.

All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746. In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated.

The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for collapsing margins of objects in a document, the system comprising:
    a processing unit; and
    a computer storage media having instructions executable by the processing unit stored thereupon configured to provide a collection component for collecting object information of objects in the document and associated object margins in a margin neighborhood of the objects and a margin component for collapsing the margins in a single formatting pass for placement of the objects in the document the single formatting pass comprising parsing the objects in the margin neighborhood until an end of the margin neighborhood is reached, a cleared object is encountered, or a float object is encountered that has no parent in the margin neighborhood, collapsing margins detected during the parsing of the objects, assigning top space to each non-empty object having a first top margin, and assigning zero top space to one or more child objects of the non-empty object, and collapsing margins for all objects preceding an empty object having no preceding parent in the margin neighborhood, collapsing a top margin of the empty object, combining margins preceding the empty object with a top margin of the empty object and one or more margins inside the empty object, and collapsing the margins of any children objects of the empty object, and placing parsed objects in the document.

2. The system of claim 1, wherein the objects include at least one of cleared objects, float objects, or empty objects.

3. The system of claim 1, wherein the collection component further reports object properties of an object that include one or more of size of top and bottom object margins, if the object is in-flow or out-of-flow, if the object has a clear property, or if the object is empty.

4. The system of claim 1, wherein the margin component combines all margins by adding a most positive margin and a most negative margin to obtain a resulting white space, and allocates the white space for a last margin on a top level.

5. The system of claim 1, wherein the margin component generates margin space and inserts the margin space as a last margin on a top level.

6. The system of claim 1, wherein the margin component processes at least one of a static clear or a dynamic clear.

7. A computer-implemented method of collapsing margins for objects in a document, the method comprising performing computer-implemented operations for:

receiving margin neighborhood information of a margin neighborhood in a document of objects;

receiving object information of the objects associated with the margin neighborhood according to an order of appearance of the associated objects in the document; and collapsing margins of the margin neighborhood in a single formatting pass for placement of the objects in the document, the single formatting pass comprising parsing the objects in the margin neighborhood until an end of the margin neighborhood is reached, a cleared object is encountered, or a float object is encountered that has no parent in the margin neighborhood, collapsing margins parsed prior to reaching the end of the margin neighborhood, the cleared object was encountered, or the float object was encountered, assigning top space to each non-empty object having a first top margin, and assigning zero top space to one or more child objects of the non-empty object, collapsing margins for all objects preceding an empty object having no preceding parent in the margin neighborhood, collapsing a top margin of the empty object, combining margins preceding the empty object with a top margin of the empty object and one or more margins inside the empty object, and collapsing the margins of any children objects of the empty object, restarting collapsing of the margins in the margin neighborhood after reaching a clearance, and computing sizes of the collapsed margins for use in laying out the objects in the document, and placing parsed objects in the documents.

8. The method of claim 7, wherein the object information indicates whether an object overhangs a left and a right of a beginning of the margin neighborhood and length of the overhang.

9. The method of claim 7, wherein the neighborhood information comprises properties of an object belonging to the margin neighborhood, the properties comprising one or more of size of top and bottom object margins, a property indicating if the object is in-flow or out-of-flow, a property indicating if the object has a clear property, or a property indicating if the object is empty.

* * * * *